United States Patent [19]

Miller

[11] Patent Number: 5,003,455
[45] Date of Patent: Mar. 26, 1991

[54] CIRCUITRY AND METHOD FOR CONTROLLING THE FIRING OF A THYRISTOR

[75] Inventor: Luther Miller, Plano, Tex.
[73] Assignee: Polyspede Electronics Corporation, Dallas, Tex.
[21] Appl. No.: 567,273
[22] Filed: Aug. 14, 1990
[51] Int. Cl.[5] .......................................... H02M 7/797
[52] U.S. Cl. .................................... 363/87; 323/244; 363/84; 363/129
[58] Field of Search ............... 318/505, 506, 703, 722; 323/244; 363/54, 81, 85, 87, 88, 128, 129; 388/830

[56] References Cited

U.S. PATENT DOCUMENTS

| | | |
|---|---|---|
| 3,177,418 | 4/1965 | Meng . |
| 3,373,331 | 3/1968 | Dow . |
| 3,737,748 | 6/1973 | Teders . |
| 3,940,680 | 2/1976 | Tadokoro et al. ................. 318/506 |
| 3,944,907 | 3/1976 | Weit ...................................... 363/54 |
| 4,262,241 | 4/1981 | Azusawa ............................ 318/703 |
| 4,409,648 | 10/1983 | Kobari et al. . |
| 4,417,187 | 11/1983 | Bateika . |
| 4,571,668 | 2/1986 | Azusawa et al. ..................... 363/87 |
| 4,748,389 | 5/1988 | Nakakuki . |

Primary Examiner—Benjamin R. Fuller
Assistant Examiner—Larry Moskowitz
Attorney, Agent, or Firm—Baker & Botts

[57] ABSTRACT

Circuitry and methods are provided for AC line synchronization of the firing means for phase-controlled thyristors in a DC motor speed control system. A line synchronization method and system is disclosed which eliminates zero offset in the phase command input function. This zero offset, which is cuased by motor counter EMF, occurs in prior art controllers which use zero crossings of the AC line voltages for line synchronization of thyristor firing. This invention provides line synchronization timing intervals of constant duration that terminate at the coincidence of AC line voltage and motor counter EMF with the coincidence being the latest time at which the particular thyristor being controlled is forward biased in the absence of current flow. Application to N-phase AC to DC converters for DC motor speed control is disclosed. Application to N-phase AC to DC converters for control of the DC bus voltage of variable frequency voltage-source inverters controlling the speed of an AC motor or a brushless DC motor is also disclosed.

40 Claims, 5 Drawing Sheets

MOTOR CONTROL SYSTEM

FIG. 1
MOTOR CONTROL SYSTEM

CIRCUITRY AND METHOD FOR CONTROLLING THE FIRING OF A THYRISTOR

TECHNICAL FIELD OF THE INVENTION

This invention relates in general to electric motor speed control, and more particularly to circuitry and methods for controlling the AC line synchronization of phase-controlled thyristors in such a way as to eliminate zero offset in the phase command function.

BACKGROUND OF THE INVENTION

The function of a typical motor speed controller is to regulate the speed of a connected motor to a desired value and to limit or regulate motor current to a safe level. To accomplish these functions thyristor type controllers must include not only regulator circuitry but also thyristor firing circuitry and line synchronization circuitry which fixes the time axis relationship between the thyristor firing pulses and the AC line voltages.

One type of control system is a regenerative control system which is capable of controlling power flow from an AC line to the motor (motoring action) or power flow from the motor back into the AC line (generating action). In regenerative control circuits a thyristor bridge rectifies the AC line voltages and through a conversion process known in the art as phase control applies a fraction of the maximum available rectified line voltage to the motor causing current to flow through the motor which subsequently causes it to rotate. The fraction of available voltage applied to the motor is determined by the magnitude of the phase command. As the motor rotates, a speed feedback output is produced which is proportional to the motor speed.

Regulators, which are generally high gain closed loop systems, drive a phase command to whatever polarity and magnitude is required to force the feedback function to agree with the corresponding command function. The typical loop architecture causes the speed loop to be satisfied except when the current which is required to do so exceeds the current limit command. In any case, the net result is that the regulator section outputs a phase command which controls the fractional part of AC line voltage that the thyristors apply to the motor thereby determining the current which flows through the motor.

In order for the phase command to exercise control as described, each firing pulse generator is synchronized to the appropriate AC line by an "enable" timing interval which is typically of 180 electrical degrees duration. During this interval, timing of the firing pulse for a connected thyristor occurs under control of a phase command signal.

In the prior art methods, timing intervals start and end at the zero crossings (zero voltage points) of a given line to line AC voltage. This method is suitable for controlling thyristor bridges which control the current to resistive or inductive loads which do not contain an active voltage component such as the counter EMF of a rotating DC motor. When prior art timing methods are utilized with thyristor bridges controlling DC motors, however, the counter EMF of the rotating motor causes the magnitude of the phase command required to produce zero current to the motor to increase proportional to the counter EMF of the motor. This occurs because, in the absence of thyristor conduction, the polarity of voltage across a given thyristor, and thus the period in which it may be fired, is determined not by just a line voltage, but by the sum of a line voltage and the counter EMF of the motor.

This load-voltage-induced offset in the phase command is undesirable for several reasons, particularly if the thyristor bridge is bidirectional and capable of producing either polarity of current to the motor. Such bridges are actually two independent back-to-back bridges and logic must be provided in prior art controllers to select the correct bridge to satisfy the regulator loop which is providing the phase command. If it were not for the load-voltage-induced offset in the phase command, the polarity of the phase command could be used to directly control the polarity of the motor current and bridge selection logic would not be necessary. Other disadvantages caused by the zero offset of prior art controllers include inability of the controller to safely start a rotating motor, snap-on and dead band effects, and potentially damaging current surges that can occur if the phase command is forced to zero as a means of protective shutdown of the controller.

Thus, there is a need in the art for an improved functional block within a thyristor control system for DC motors or for control of the DC bus voltage of AC variable frequency motor controls of the voltage-source type. Specifically, there is a need in the art for circuitry which accurately synchronizes thyristor firing pulses to AC lines when the connected load includes an active voltage component.

SUMMARY OF THE INVENTION

The primary object of the present invention is to eliminate the load-voltage induced offset in the phase command voltage which controls thyristor firing. Accordingly, the present invention provides method and circuitry for causing the line synchronization timing intervals to end at the coincidence of an AC line-to-line voltage and the counter EMF of the connected DC motor. This coincidence occurs at the latest time at which the thyristor being controlled is forward biased in the absence of current flow. Additionally, method and circuitry is provided to cause the revised line synchronization timing interval to be of constant duration to maintain compatability with circuitry commonly used in the connected firing pulse generators.

The use of this line synchronization timing interval in lieu of the prior art timing interval which starts and terminates at the zero crossings of a related AC line voltage eliminates the load-voltage-induced offset in the phase command. Elimination of this offset substantially eliminates the disadvantages and problems associated with prior art method and circuitry.

When applied to regenerative motor controls utilizing back-to-back thyristor bridges, elimination of the offset in the phase command signal by the method of the present invention accomplishes several improvements over the prior art. Some of these improvements are:

(1) Using the polarity of the phase command to select the correct thyristor bridge to produce the required polarity of motor current; this greatly simplifies design of the regulator circuitry and eliminates additional bridge-select logic. In prior art controllers polarity of the command could not be used for bridge selection because of the load-voltage-induced offset of the phase command function.

(2) Elimination of dead band and snap-on effects which are inherent in the prior art.

(3) Implementing protective shutdown by forcing the phase command function to zero is a safe mode of shutdown in the present invention in that zero magnitude of the phase command function unconditionally commands zero current in the thyristor bridges. In prior art controllers, forcing the phase command to zero causes an uncontrolled current surge that is dependent on motor speed. This surge occurs because the previously inactive bridge is phased on because of the zero offset in the phase command function.

(4) Starting of a rotating motor is an inherently safe operation in that as a "start" is initiated, the phase command, assumed to be clamped to zero level prior to the "start", is at a safe zero level which commands zero current in the thyristor bridges at the moment that the start is initiated. This allows the regulators to smoothly assume control of motor operating conditions without the uncontrolled current surge which would occur in prior art control systems. Speed changes necessary for the motor to reach the commanded speed are accomplished under full control of the associated regulator circuitry.

In the following discussion of the various aspects of my invention, a fixed polarity of DC motor counter EMF is assumed for descriptive purposes, thereby allowing the associated assignment of thyristors which are to cause motoring action and thyristors which are to cause generating action. If polarity of the DC motor counter EMF is reversed relative to the assigned polarity, the assigned generating and motoring roles of the thyristors will also reverse, but the description of the timing intervals which follow remains accurate.

In the first aspect of the invention, a timing interval for a thyristor which is to cause motoring action ends at the coincidence of line voltage of negative slope and motor counter EMF. This timing interval starts at the coincidence of line voltage of positive slope and inverted motor counter EMF. Similarly, a timing interval for a thyristor which is to cause generating action ends at the coincidence of line voltage of positive slope and motor counter EMF. This timing interval starts at the coincidence of line voltage of negative slope and inverted motor counter EMF. The result is two 180 degree timing intervals one of which synchronizes the firing of a thyristor which controls motoring action and the other of which synchronizes the firing of a thyristor which controls generating action. For thyristors connected in a bridge arrangement the complements of these two timing intervals are also required. These complements are readily generated by well known prior art.

In a second aspect of the invention, timing intervals identical to those of the first aspect are created by a slightly different method and system. This method and system utilizes the complement of the AC line voltage but does not require the inverted value of motor counter EMF. In this method and system the timing interval for a thyristor which is to cause motoring action ends at the coincidence of line voltage of negative slope and motor counter EMF. This timing interval starts at the coincidence of the complement of AC line voltage, said complement being of negative slope, and motor counter EMF. Similarly the timing interval for a thyristor which is to cause generating action ends at the coincidence of line voltage of positive slope and motor counter EMF. This timing interval begins at coincidence of the complement of line voltage, said complement being of positive slope, and the motor counter EMF. For thyristors connected in a bridge arrangement, the complements of these two timing intervals are also required. These complements are readily generated by well known prior art.

In a third aspect of the invention, circuitry creates timing intervals which end at times defined in the description of the first and second aspects but are of fixed duration less than 180 electrical degrees. Accordingly, the timing interval for a thyristor which controls motoring action ends at the coincidence of line voltage of negative slope and motor counter EMF. This timing interval begins at the coincidence of a reference AC voltage of negative slope and the motor counter EMF. Similarly, the timing interval for a thyristor which is to cause generating action ends at the coincidence of line voltage of positive slope and motor counter EMF. This timing interval begins at the coincidence of a reference AC voltage of positive slope and the motor counter EMF. The reference AC voltage is a voltage which leads the line voltage by a certain number of degrees; the lead angle therefore determines the duration of the timing intervals. In this aspect of the invention, the reference voltage may be generated by causing a lag of a voltage representative of the complement of the line voltage, or it may be derived from three phase AC line voltages or various vector additions thereof by methods known in prior art. For thyristors connected in a bridge arrangement, two additional signals shifted 180 degrees from these two timing intervals are also required.

Other aspects of the present invention include application of this method of synchronizing thyristors to the AC lines when multiple thyristors are connected as single phase, three phase, or n-phase converters of either full wave or half wave types for purposes of controlling the operating parameters of a connected DC motor.

Still further aspects of the present invention include application of this method of synchronizing thyristors to the AC lines when thyristors are connected as single phase, three phase or n-phase converters of either full wave or half wave types for the purpose of controlling the DC bus voltage of a variable frequency AC motor control system of the voltage source type or of a brushless DC motor control system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention is best understood by referring to FIGS. 1–12 of the drawings, like numerals being used for like and corresponding parts of the various drawings. Reference is also made to CIRCUIT AND METHOD OF PROTECTING THYRISTORS, filed concurrently herewith and incorporated by reference.

Figure 1:
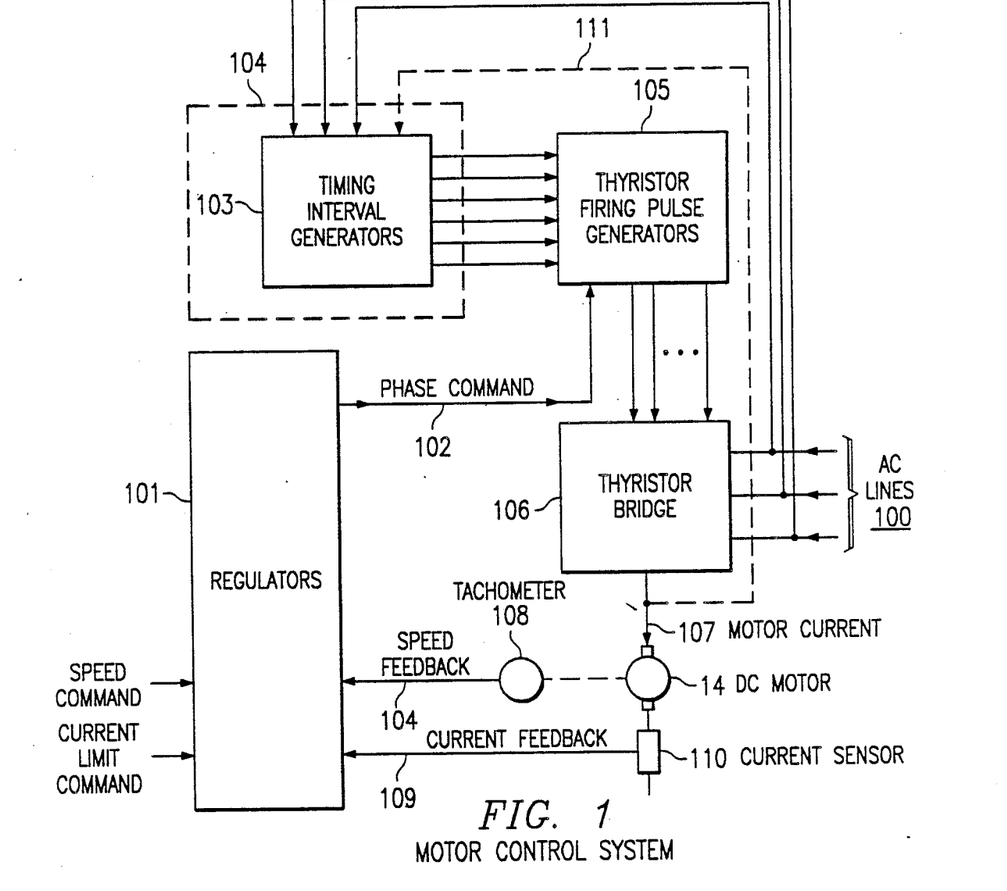
FIG. 1 illustrates a block diagram of a typical DC motor speed control system.

FIG. 1 is a generalized block diagram of a typical thyristor DC motor control system applicable to the prior art or, with the inclusion in the control system of signal 111, to the present invention.

In FIG. 1, thyristor bridge 106 rectifies the AC line voltages through a conversion process known in the art as phase control and applies a fraction of the maximum available rectified line voltage to motor 14 causing current 107 to flow through motor 14 which subsequently causes it to rotate. The fraction of available voltage applied to motor 14 is determined by the magnitude of phase command 102. As the motor rotates, tachometer 108 also rotates producing a speed feedback output 104 which is proportional to motor speed. Also as motor current 107 flows, current sensor 110 produces current feedback signal 109.

Regulators 101 are generally high gain closed loop systems that drive phase command 102 to whatever polarity and magnitude is required to force feedback function 104 or 109 to agree with the corresponding command function. The typical loop architecture within regulators 101 causes the speed loop to be satisfied, except when current 107 which is required to do so exceeds the current limit command. In any case, the net result is that regulators 101 outputs a phase command 102 which, acting through elements 105 and 106, controls the fractional part of the AC line voltage that the thyristors apply to motor 14 thereby determining current 107 which flows through motor 14.

In order for phase command 102 to exercise control over current 107 as described, each firing pulse generator in element 105 is synchronized to the appropriate AC line by an "enable" timing interval which is generated in block 103 and is typically of 180 electrical degrees duration. During this interval, timing of the firing pulse for a connected thyristor occurs under control of phase command 102.

As discussed above, in the prior art method, timing intervals start and end at the zero crossings (zero voltage points) of a given line to line AC voltage. This method is suitable for controlling thyristor bridges which control the current to resistive or inductive loads which do not contain an active voltage component such as the counter EMF of a rotating DC motor. When prior art timing methods are utilized with thyristor bridges controlling DC motors, however, the counter EMF of the rotating motor causes the magnitude of the phase command 102 required to produce zero current 107 to motor 14 to increase proportional to the counter EMF of the motor. This occurs because, in the absence of thyristor conduction (in other than three phase operation), the polarity of voltage across a given thyristor, and thus the period in which it may be fired, is determined not by just a line voltage, but by the sum of a line voltage and the counter EMF of the motor. In three phase service, the preceding is true following the firing of one thyristor.

This load-voltage-induced offset in phase command 102 is undesirable for several reasons, particularly if the thyristor bridge is bidirectional and capable of producing either polarity of current to motor 14. Such bridges are actually two independent back-to-back bridges and logic must be provided in prior art controllers to select the correct bridge to satisfy the regulator loop which is providing phase command 102. If it were not for the load-voltage-induced offset in phase command 102, the polarity of phase command 102 could be used to directly control the polarity of motor current 107 and bridge selection logic would not be necessary. Other disadvantages caused by the zero offset of prior art controllers include inability of the controller to safely start a rotating motor, snap-on and dead band effects, and potentially damaging current surges that can occur if 102 is forced to zero as a means of protective shutdown of the controller.

As will be seen, these problems are eliminated by timing interval generators 103 operating from signal 111. Prior to discussing this operation, some additional discussion of the prior art is appropriate.

Figure 2:
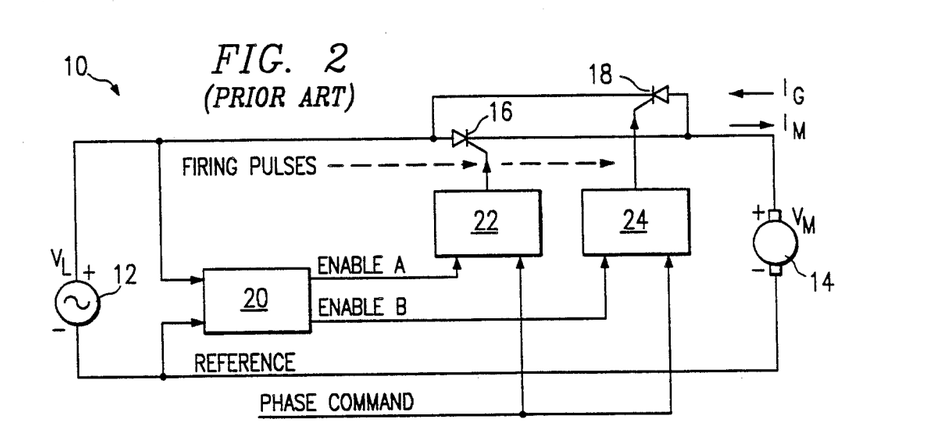
FIG. 2 illustrates a block diagram of the phase-control portion of a prior art DC motor speed control system.

FIG. 2 illustrates a block diagram of the phase control portion of a prior art motor speed controller, indicated generally as 10. For simplicity, a simple back-to-back thyristor pair controlling single-phase half-wave rectified current to a DC motor is shown. However, the same principle disclosed herein also applies to full-wave and half-wave rectified single phase and three-phase circuits. For purposes of this description, polarities have been assigned to various terminals of the drawings.

In prior art circuit 10, the negative terminal of an AC voltage source 12 serves as the circuit reference and is coupled to the negative terminal of DC motor 14. The positive terminal of AC voltage source 12 is coupled to the anode of a first thyristor 16 and to the cathode of a second thyristor 18. One input of a timing interval generator 20 is also coupled to the negative terminal of AC voltage source 12 and the other input of timing interval generator 20 is coupled to the positive terminal of AC voltage source 12. One output of timing interval generator 20 is coupled to the ENABLE input of a first firing pulse generator 22 and the second output of timing interval generator 20 is coupled to the ENABLE input of a second firing pulse generator 24. A phase command signal is received at the second inputs of firing pulse generators 22 and 24. The output of firing pulse generator 22 is coupled to the gate of thyristor 16 and the output of firing pulse generator 24 is coupled to the gate of thyristor 18.

For the polarities assigned, thyristor 16 furnishes current from AC voltage source 12 to motor 14 ($I_M$) while thyristor 18 furnishes current from motor 14 back to AC voltage source 12 ($I_G$). Thyristors 16 and 18 only conduct when they are forward biased and receive a firing pulse from their associated firing pulse generator 22 or 24. Conduction of thyristors 16 and 18 ceases when the sum of AC line voltage, $V_L$, and motor terminal voltage, $V_M$, is in a direction to back bias the conducting thyristor and when energy stored in the inductance of motor 14 decays to zero at which time thyristor current also reaches zero. The magnitude of a current pulse so produced for given values of motor inductance, AC line voltage, $V_L$, and motor terminal voltage, $V_M$, is determined by the time within a particular cycle of the AC voltage source 12 at which a firing pulse energizes the gate of the thyristor which is to be triggered into conduction. This action is commonly called phase control. The time within an AC voltage cycle at which the firing pulse occurs is determined by the phase command signal which is input to firing pulse generators 22 and 24. Additionally, the firing pulse generator must be enabled by timing interval generator 20 for the firing pulse generator to produce the commanded firing pulse to a thyristor.

Figure 3:
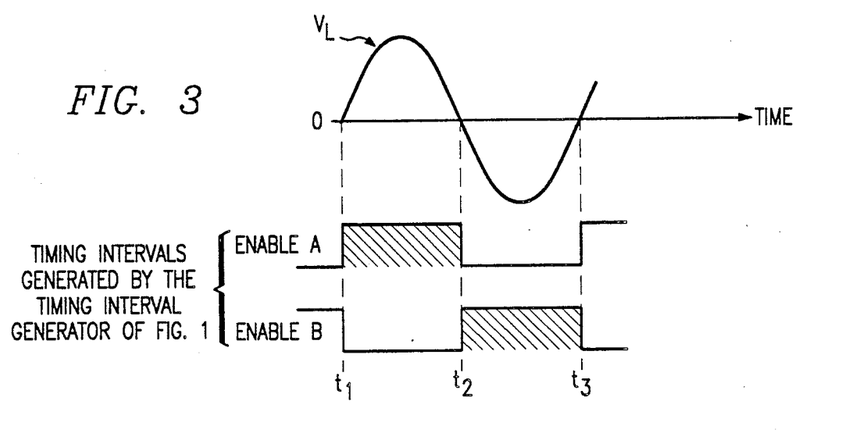
FIG. 3 illustrates wave forms of the prior art timing interval generator within FIG. 1 with $V_M = 0$.

FIG. 3 illustrates two wave forms from prior art circuit 10 of FIG. 2 in which it is assumed that motor terminal voltage, $V_M$, is equal to zero. When the AC line voltage, $V_L$, from AC voltage source 12 is positive with respect to the reference voltage (from time $t_1$ to $t_2$) firing pulse generator 22 is enabled by signal ENABLE A and thyristor 16 is forward biased. Consequently, thyristor 16 will conduct at any time during the period $t_1$ to $t_2$ at which the phase command causes generator 22 to produce a firing pulse. Similarly, $V_L$ is negative with respect to reference between times $t_2$ and $t_3$ firing pulse generator 24 is enabled during this time by signal ENABLE B and thyristor 18 is forward biased and ready to conduct. Thus, timing interval generator 20 of prior art circuit 10 is a zero crossing detector which produces two fixed ENABLE outputs of 180 degrees duration, each displaced 180 degrees from the other.

Prior art circuit 10 provides correct ENABLE outputs when $V_M$ equals zero as illustrated in FIG. 3 because the trailing edges of the generated ENABLE signals correspond to the latest times within an AC cycle at which the associated thyristor is forward biased, assuming that neither thyristor is conducting.

Figure 4:
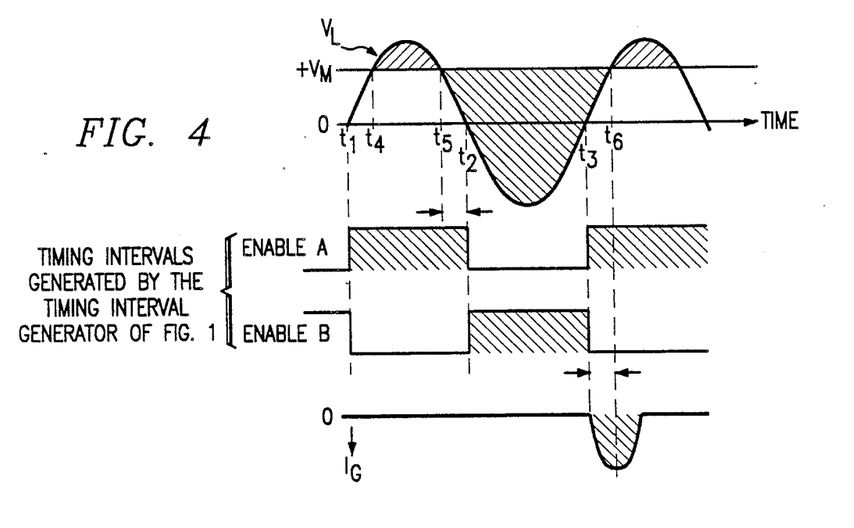
FIG. 4 illustrates wave forms of the prior art timing interval generator within FIG. 1 with $V_M$ other than zero.

In a practical situation, the motor terminal voltage, $V_M$, is more likely to have a value other than zero. FIG. represents wave forms from prior art circuit 10 with $V_M$ other than zero illustrating the disadvantages of the fixed timing signals of prior art circuit 10. As before, signal ENABLE A is active between times $t_1$ and $t_2$, corresponding to the positive half of the AC line cycle. Similarly, signal ENABLE B is active between times $t_2$ and $t_3$, corresponding to the negative half of the AC line cycle. For the conditions shown in FIG. 4, thyristor 16 which controls motoring currents, remains forward biased and eligible to be fired only until time $t_5$, while thyristor 18 which controls generating currents, remains forward biased until time $t_6$. The mismatch of latest forward-biased times $t_5$ and $t_6$, and the latest time-to-fire dictated by the trailing edges of the ENABLE A AND ENABLE B timing intervals, is operative to cause a dead band characteristic in phase commands that signal motoring currents, and a snap-on characteristic in phase commands that signal generating currents. These undesirable effects are described in part as follows:

A phase command that for zero motor voltage $V_M$ would produce firing of thyristor 16 at time $t_2$, must, for the motor voltage conditions of FIG. 4, increase through a dead band which is proportional to the difference between times $t_5$ and $t_2$ before firing of thyristor 16 can occur at $t_5$.

Conversely, a generating phase command of very small magnitude will, for the conditions shown in FIG. 4, cause thyristor 18 to snap on from zero conduction to the significant conduction level shown in the lower graph of FIG. 4, resulting in a step function of generating current that is proportional to the difference between times $t_6$ and $t_3$. Furthermore, as the motor terminal voltage changes due to motor speed changes, the magnitude of dead band and snap-on also changes.

Various circuit means are used in prior art to correct these dead band and snap-on effects, but most of the methods used involve significant compromises because of the fixed relationship between the timing intervals and the zero crossings of the AC line. Also prior art corrections do not generally correct zero offset of the phase command.

Figure 5:
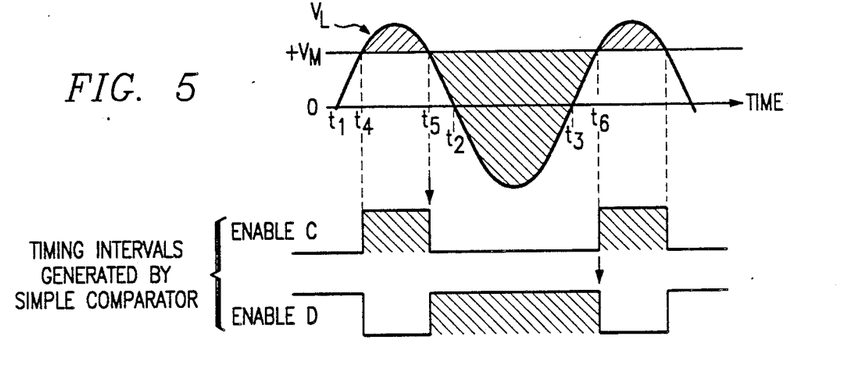
FIG. 5 illustrates asymmetrical "enable" signals generated by a timing interval generator.

FIG. 5 illustrates more desirable wave forms in which dead band and snap-on effects are eliminated. Rather than using the zero-crossing circuitry of the prior art, the invention uses a timing interval generator having simple comparator circuitry which allows signals ENABLE C and ENABLE D of FIG. 5 to be generated corresponding to the times of an AC cycle during which a first and a second thyristor, respectively, are forward biased. Such a comparator circuit senses when $V_L$ is more positive or more negative than $V_M$. The resulting timing signal is variable, automatically adjusting the timing intervals according to motor counter EMF. The ending time of each ENABLE signal, $t_5$ or $t_6$ indicated by the down-arrows in FIGS. 5 and 6, always corresponds to the time the appropriate thyristor ceases, in the absence of current flow, to be forward biased.

Figure 6:
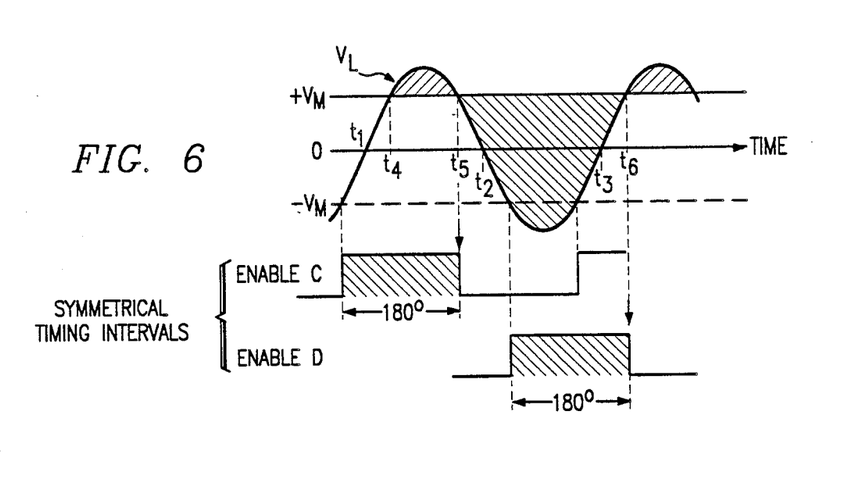
FIG. 6 illustrates desirable symmetrical wave forms generated by signals ENABLE C and D of the present invention.

Although this implementation is suitable for use with certain circuit configurations, some firing pulse generators require symmetrical timing intervals of constant duration for correct operation (which, for a simple comparator circuit, would occur only when $V_M$ equals zero). Consequently, the asymmetrical ENABLE signals of FIG. 5 are not universally useful. It is desirable, therefore, to convert the ENABLE C and ENABLE D signals to symmetrical timing signals while still maintaining the time axis location of the points indicated by the down arrows. Such symmetrical wave forms are illustrated in FIG. 6, in which ENABLE C and ENABLE D are each active for one-half, or 180 degrees, of one AC cycle. Note that, as $V_M$ changes in magnitude (due to motor speed changes), both ENABLE signals remain active for the desired 180 degrees. ENABLE C shifts to the left and ENABLE D shifts to the right as $V_M$ increases in positive magnitude.

Figure 7:
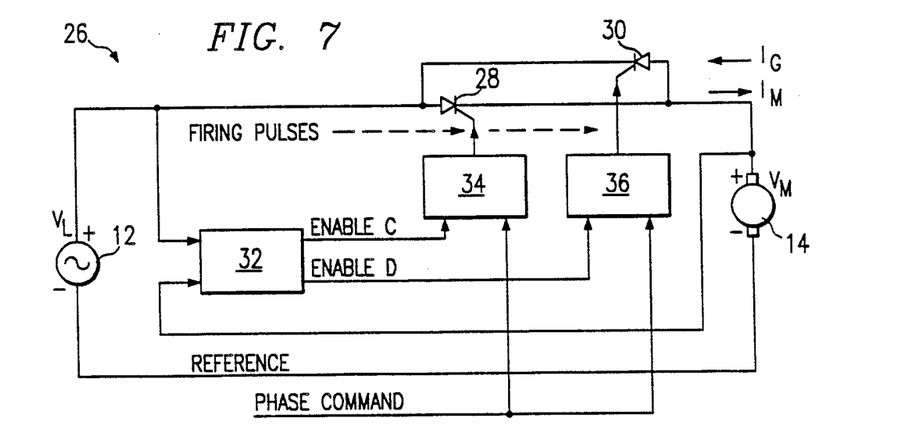
FIG. 7 illustrates a block diagram of the phase-control portion of a DC motor speed controller utilizing the present invention.

FIG. 7 illustrates a block diagram of the phase control portion of a simple motor speed controller utilizing the present invention, indicated generally as 26. The negative terminal of AC voltage source 12 again serves as a voltage reference and is coupled to the negative terminal of motor 14; the positive terminal of AC voltage source 12 is coupled to the anode of thyristor 28 and to the cathode of thyristor 30. The cathode of thyristor 28 and the anode of thyristor 30 are coupled to the positive terminal of motor 14. Thus, thyristors 28 and 30 comprise a thyristor pair and are coupled in a back-to-back configuration. One input of a timing interval generator 32 of the present invention 26 is coupled to the positive terminal of AC Voltage source 12. The other input of timing interval generator 32 is coupled to the positive terminal of motor 14. The outputs of timing interval generator 32 carrying ENABLE C and ENABLE D signals are coupled to the enable inputs of firing pulse generators 34 and 36, respectively. The output of firing pulse generator 34 is coupled to the gate of thyristor 28 and the output of firing pulse generator 36 is coupled to the gate of thyristor 30. A phase command signal is also input into firing pulse generators 34 and 36.

As can be seen in FIG. 7, the change from FIG. 2 (prior art) is that the motor terminal voltage $V_M$ is used differentially with $V_L$ as input to timing interval generator 32. In operation, timing interval generator 32 compares $V_M$ with $V_L$. It then generates signals ENABLE C and ENABLE D such that their ending times correspond with the times at which thyristors 28 and 30, respectively, are no longer forward biased in the absence of current flow. These ending times correspond with $t_5$ and $t_6$ respectively, of FIG. 6. If the speed of motor 14 changes, the $V_M$ will also change. However, timing interval generator 32 will factor the change into account, make a correction and generate appropriate ENABLE signals such that ending times of the two signals agree with the appropriate coincidences of $V_L$ and $V_M$. Thus, controller 26 of the present invention provides variable timing signals responsive to changes in $V_M$.

Figure 8:
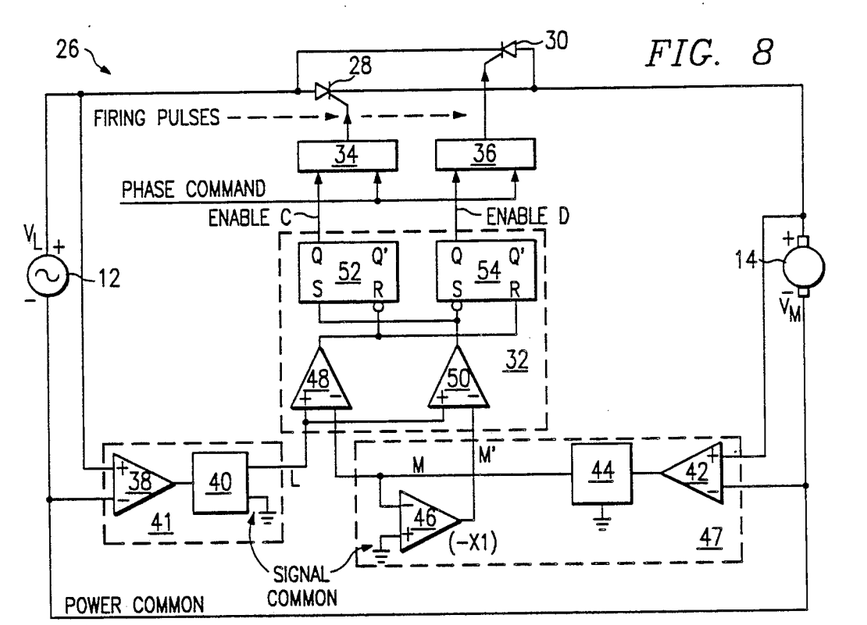
FIG. 8 illustrates a schematic diagram of the present invention in a single phase half-wave configuration.

FIG. 8 is a more detailed schematic diagram of one embodiment of circuit 26 of the present invention which produces the wave forms shown in FIG. 6. The negative terminal of AC voltage source 12 serves as the power common and is coupled to the negative terminal of motor 14. Thyristors 28 and 30 are coupled in a back-to-back, thyristor pair configuration between the AC voltage source 12 and the motor 14. The positive terminal of AC voltage source 12 is coupled to the anode of thyristor 28 and to the cathode of thyristor 30; the cathode of thyristor 28 and the anode of thyristor 30 are coupled to the positive terminal of motor 14. The outputs of firing pulse generators 34 and 36 are coupled to the gates of thyristors 28 and 30, respectively, and the phase command signal is input into firing pulse generators 34 and 36.

Inputs of differential amplifier 38 are coupled across AC voltage source 12, and the output of differential amplifier 38 is coupled to the input of filter 40. Differential amplifier 38 and filter 40 comprise a line voltage module 41 which produces a signal representing line voltage. Inputs of a second differential amplifier 42 are coupled across the terminals of motor 14 and the output of differential amplifier 42 is coupled to the input of a second filter 44. The input of a single ended unity gain inverting amplifier 46 is coupled to the output of filter 44 and signal common. Amplifiers 42 and 46 and filter 44 comprise a motor terminal voltage module 47. The output of filter 40, which represents line voltage, is coupled to the non-inverting inputs of two comparators 48 and 50 of timing interval generator 32. The output of filter 44, which represents motor terminal voltage, is coupled to the inverting input of comparator 48. The output of inverting amplifier 46, which represents inverted motor terminal voltage, is coupled to the inverting input of comparator 50. The output of comparator 48 is coupled to the negative-edge triggered R input port of a first set-reset flip-flop 52 and the positive edge-triggered R input port of a second set-reset flip-flop 54, both of timing interval generator 32. The output of comparator 50 is coupled to the positive edge-triggered S input port of flip-flop 52 and to the negative-edge triggered S input port of flip-flop 54. The non-inverting output of flip-flop 52 is coupled to the ENABLE input of firing pulse generator 34 and the non-inverting output of flip-flop 54 is coupled to the ENABLE input of firing pulse generator 36. The inverting outputs of flip-flops 52 and 54 are not used in this configuration.

In operation, filter 40 removes short duration extraneous spikes and noise from AC voltage source 12 which remain in the output of differential amplifier 38 and outputs signal $V_L$. Filter 44 filters the AC line voltage harmonic from the motor terminal voltage and outputs a smoothed average value of $V_M$, indicated as M in FIG. 8, to comparator 48. Voltage $V_M$, thus smoothed, adequately approximates motor counter EMF. Inverter 46 inverts the smoothed $V_M$ to generate the $-V_M$ voltage indicated as M', which inputs comparator 50 as shown in FIG. 8. As illustrated in FIG. 6, signal ENABLE C is active when $V_L$ of positive slope coincides with $-V_M$ and terminates at $t_5$ when $V_L$ of negative slope coincides with $+V_M$. Signal ENABLE D becomes active when $V_L$ of negative slope coincides with $-V_M$ and terminates at $t_6$ when $V_L$ of positive slope coincides with $+V_M$. Consequently, a pair of 180 degree timing intervals are generated whose trailing edges are in agreement with the critical times $t_5$ and $t_6$ at which times, in the absence of current flow, thyristors 28 and 30 become reversed biased by the series combination of voltage sources 12 and 14.

In an alternative embodiment of the present invention, differential amplifiers 38 and 42 could be replaced with simple resistive voltage dividers in which case the signal common and power common indicated in FIG. 8 would become electrically identical. However, in situations in which there is no identifiable power common point, such as in single-phase and three-phase bridge converters, differential amplifiers 38 and 42 (or their equivalent circuit functions) are necessary to create the signal common shown in FIG. 8.

The circuit of FIG. 8 produces half-wave AC to DC conversion in a manner well known to prior art and described as follows. To produce motoring current for the polarity shown, thyristor 28 is fired which causes power to be delivered from the AC source 12 to the motor 14. Similarly, to produce generating current for the polarities shown, thyristor 30 is fired which causes power to be transferred from motor 14 back to the AC source 12.

As a consequence of normalization of the phase command achieved by this invention (elimination of zero offset in the phase command), one polarity of the phase command causes firing of thyristor 28 while the opposite polarity of the phase command causes firing of thyristor 30. Thus, the entire circuit of FIG. 8 may be viewed as an amplifier (although a non-linear one) which amplifies the phase command and applies the amplified result to motor 14. Addition of speed and current regulator loops as shown in FIG. 1 completes the motor control system encompassing the advantages claimed in this invention.

Figure 9:
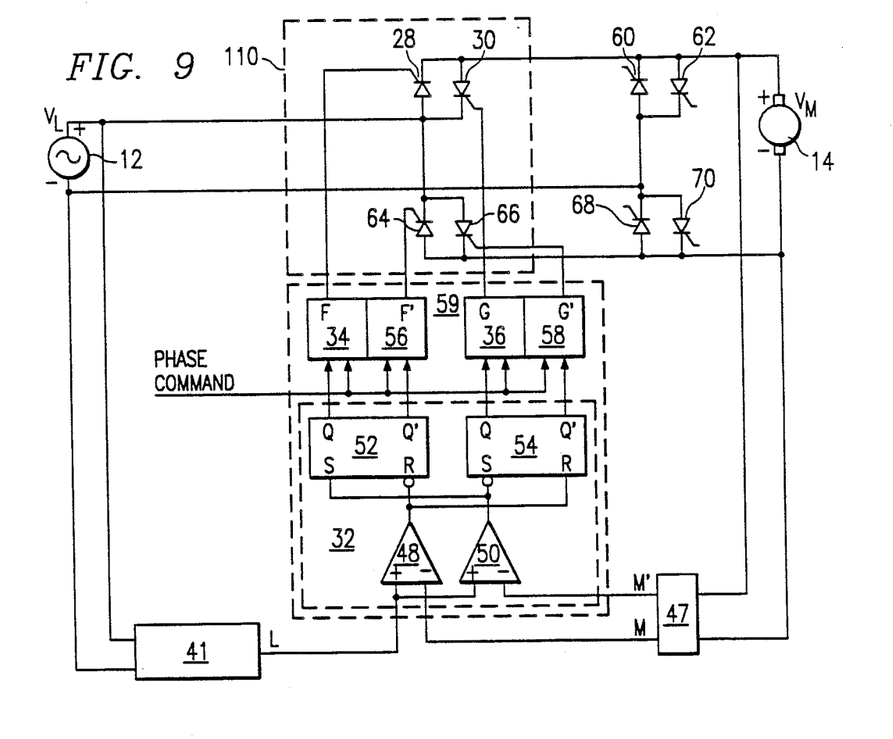
FIG. 9 illustrates a schematic diagram of the present invention in a single-phase full-wave bridge configuration.

FIG. 9 illustrates an expansion of the basic configuration of the present invention to the more commonly used single-phase full-wave bridge configuration in which four thyristor pairs are used. The inputs of line voltage module 41 are coupled across the terminals of AC voltage source 12. The output of line voltage module 41 is coupled to the non-inverting inputs of comparators 48 and 50 of timing interval generator 32. In the first thyristor pair, the anode of thyristor 28 and the cathode of thyristor 30 are coupled to the positive terminal of AC voltage source 12. The cathode of thyristor 28 and the anode of thyristor 30 are coupled to the positive terminal of motor 14 and to one input of motor terminal voltage module 47. The negative terminal of motor 14 is coupled to the other input of motor terminal voltage module 47. The inverting output of motor terminal voltage module 47 is coupled to the inverting input of comparator 50 and the non-inverting output of motor terminal voltage module 47 is coupled to the inverting input of comparator 48. The output of comparator 48 is coupled to the negative-edge triggered R input port of flip-flop 52 and to the R input port of flip-flop 54. The output of comparator 50 is coupled to the S input port of flip-flop 52 and to the negative-edge triggered S input port of flip-flop 54. The non-inverting output of flip-flop 52 is coupled to the ENABLE input of firing pulse generator 34 and the non-inverting output of flip-flop 54 is coupled to the ENABLE input of firing pulse generator 36.

The inverting output of flip-flop 52 is coupled to the ENABLE input of a firing pulse generator 56 and the inverting output of flip-flop 54 is coupled to the EN-ABLE input of a firing pulse generator 58. Timing interval generator 32 and firing pulse generators 34, 36, 56 and 58 comprise firing module 59. In the second thyristor pair, the cathode of a thyristor 60 and the anode of a thyristor 62 are coupled to the positive terminal of motor 14. The anode of thyristor 60 and the cathode of thyristor 62 are coupled to the negative terminal of AC voltage source 12. In the third thyristor pair, the cathode of a thyristor 64 and the anode of a thyristor 66 are coupled to the positive terminal of AC voltage source 12 The anode of thyristor 64 and the cathode of thyristor 66 are coupled to the negative terminal of motor 14. In the fourth thyristor pair, the cathode of a thyristor 68 and the anode of a thyristor 70 are coupled to the negative terminal of AC voltage source 12. The anode of thyristor 68 and the cathode of thyristor 70 are coupled to the negative terminal of motor 14.

The output of firing pulse generator 34 is coupled to the gate of thyristor 28. The output of firing pulse generator 56 is coupled to the gate of thyristor 64. The output of firing pulse generator 36 is coupled to the gate of thyristor 30. The output of firing pulse generator 58 is coupled to the gate of thyristor 66.

The circuit of FIG. 9 produces full-wave AC to DC conversion in a manner well known in prior art as follows. To produce motoring currents for the polarities shown, thyristors 28 and 68 are fired simultaneously by the output of firing pulse generator 34. One hundred eighty electrical degrees later, thyristors 64 and 60 are simultaneously fired by firing pulse generator 56 which is synchronized by the Q' output of 52. Similarly, to produce generating current for the polarities shown, thyristors 30 and 70 are simultaneously fired by the output of firing pulse generator 36. One hundred eighty electrical degrees later, thyristors 66 and 62 are simultaneously fired by firing pulse generator 58 which is synchronized by the Q' output of 54.

Because of the particular characteristic of this invention, a given polarity of the phase command causes motoring current for the polarities shown by causing the firing of thyristors 28, 68, 64 and 60 in the manner described. Similarly, the opposite polarity of the phase command causes generating current for the polarities shown by causing the firing of thyristors 30, 70, 66 and 62 in the manner described. The addition of prior art regulator circuitry such as that shown in FIG. 1 or other regulator circuitry completes the functional part of the motor control system. The necessary circuitry to protect against bridge line-to-line faults is not shown in FIG. 9. Such circuitry may be that used in the prior art or that described in co-pending, patent application Ser. No. 567151, entitled CIRCUITRY AND METHOD OF PROTECTING THYRISTORS filed concurrently herewith, which is hereby incorporated by reference herein.

Figure 10:
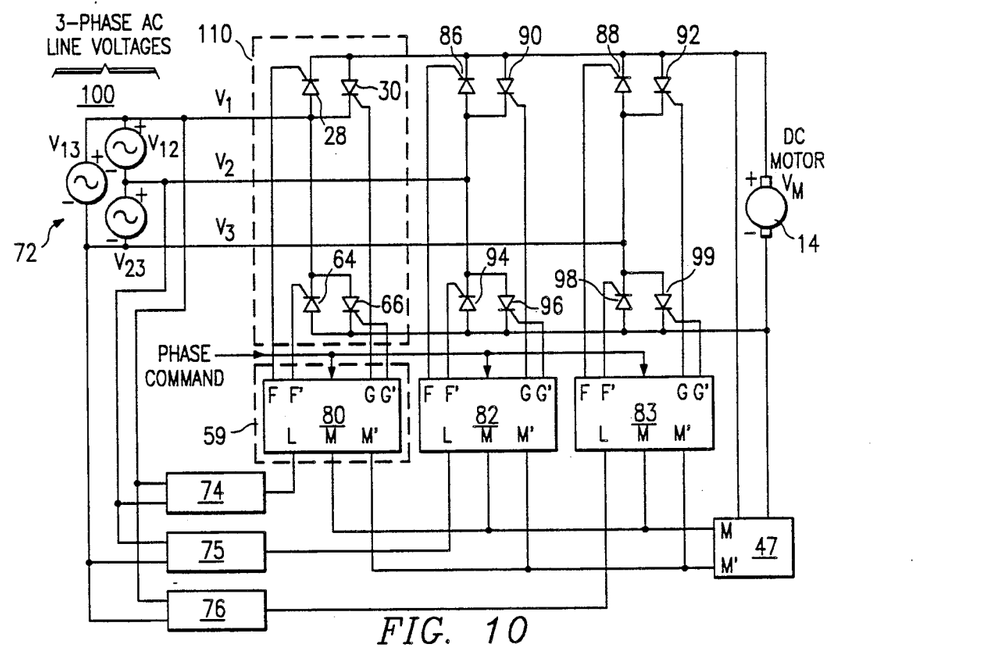
FIG. 10 illustrates a schematic diagram of the present invention in a three-phase full-wave configuration.

FIG. 10 illustrates the use of the present invention in a three-phase full-wave bridge configuration using six thyristor pairs in which one firing module 59 and one thyristor module 110 shown in FIG. 9 is used for each of the three phases of the AC voltage source. A three-phase AC line source 72 produces three line voltages $V_1$, $V_2$ and $V_3$. A line voltage module 74 is coupled between lines $V_1$ and $V_2$; a second line voltage module 75 is coupled between lines $V_2$ and $V_3$; and a third line voltage module 76 is coupled between lines $V_1$ and $V_3$. The output of line voltage module 74 is coupled to the line (L) input of a first firing module 80; the output of line voltage module 75 is coupled to the line (L) input of a second firing module 82; and the output of line voltage module 76 is coupled to the line (L) input of a third firing module 83. The non-inverting motor terminal voltage (M) inputs of firing modules 80, 82 and 83 are coupled to the non-inverting output (M) of motor terminal voltage module 47. The inverting inputs (M') of firing modules 80, 82 and 83 are coupled to the inverting output (M') of motor terminal voltage module 47.

As before, motor terminal voltage module 47 is coupled across the terminals of motor 14. The cathodes of thyristors 28, 86, 88 and the anodes of thyristors 30, 90 and 92 are coupled to the positive terminal of motor 14. The anode of thyristor 28 and the cathode of thyristor 30 are coupled to line $V_1$ of three-phase voltage source 72. The anode of thyristor 86 and the cathode of thyristor 90 are coupled to line $V_2$. The anode of thyristor 88 and the cathode of thyristor 92 are coupled to line $V_3$. The anodes of thyristors 64, 94 and 98 and the cathodes of thyristors 66, 96 and 99 are coupled to the negative terminal of motor 14. The cathode of thyristor 64 and the anode of thyristor 66 are coupled to line $V_1$ of three-phase voltage source 72. The cathode of thyristor 94 and the anode of thyristor 96 are coupled to line $V_2$. The cathode of thyristor 98 and the anode of thyristor 99 are coupled to line $V_3$.

Output F of firing module 80 is coupled to the gate of thyristor 28; output F' of firing module 80 is coupled to the gate of thyristor 64; output G of firing module 80 is coupled to the gate of thyristor 30; and output G' of firing module 80 is coupled to the gate of thyristor 66. Output F of firing module 82 is coupled to the gate of thyristor 86; output F' is coupled to the gate of thyristor 94; output G is coupled to the gate of thyristor 90; and output G' is coupled to the gate of thyristor 96. Output F of firing module 83 is coupled to the gate of thyristor 88; output F' is coupled to the gate of thyristor 98; output G is coupled to the gate of thyristor 92; and output G' is coupled to the gate of thyristor 99.

The circuit of FIG. 10 produces full-wave AC to DC conversion in a manner well known in prior art and described in part as follows. To produce motoring currents for the polarities shown, thyristors 28, 86 and 88 are fired sequentially. Similarly, thyristors 64, 94 and 98 are fired in a particular sequence to provide a current return path to the various AC lines. To produce generating currents for the polarities shown, thyristors 30, 90 and 92 are fired sequentially, and thyristors 66, 96 and 99 are fired in a particular sequence to provide a current return path to the various AC lines. The stated firing sequences are determined within modules 80, 82 and 83 according to the respective L inputs from modules 74, 75 and 76.

As was the case for the circuits of FIGS. 8 and 9 and because of the particular characteristic of this invention, polarity of the phase command selects which thyristor bridge is to conduct. One polarity of the phase command voltage causes the bridge consisting of thyristors 28, 86, 88, 64, 94 and 98 to conduct while the opposite polarity of phase command causes the bridge consisting of thyristors 30, 90, 92, 66, 96 and 99 to conduct thereby realizing the advantages over prior art claimed herein.

The addition of prior art regulator circuitry such as that shown in FIG. or other regulator circuitry completes the functional part of the motor control system. The necessary circuitry to protect against bridge line-to-line faults is not shown in FIG. 10; such circuitry may be of prior art type or that described in the aforementioned concurrently filed patent application entitled CIRCUITRY AND METHOD OF PROTECTING THYRISTORS.

A three phase half wave thyristor converter is a diminished form of the three phase full wave converter illustrated in FIG. 10 in which the lower thyristors 64, 66, 94, 96, 98 and 99 are omitted, and in which the power return of the negative terminal of motor 14 is connected to the neutral of three phase line voltages 72; this neutral is not shown in FIG. 10. The application of the invention to such a half wave converter is identical to the connections shown in FIG. 10, except that the complementary outputs F' and G' of elements 80, 82, and 83 are not used. The advantages claimed in the application of the invention to three phase full wave converters are thus also realized in the application of the invention to three phase half wave converters.

Figures 11, 12:
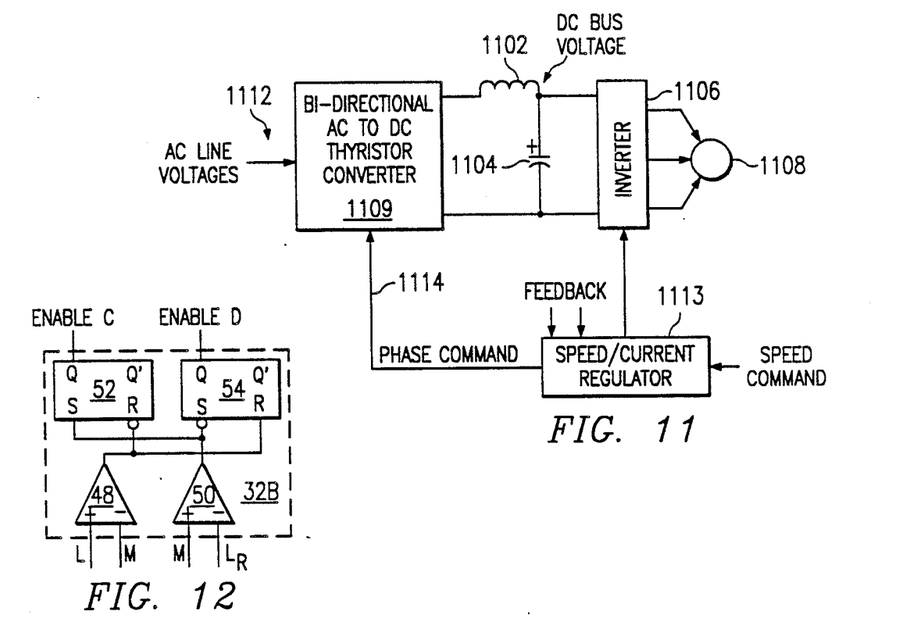
FIG. 11 illustrates a block diagram of the present invention to control DC bus voltage for a three-phase AC motor speed control.
FIG. 12 illustrates an alternate embodiment of the basic circuit elements of FIG. 8 with typical application to a single-phase full wave converter.

FIG. 11 illustrates the use of the present invention to control the DC bus voltage and/or current in an AC variable frequency motor control system. Element 1109 represents an AC to DC conversion system of a type described by FIGS. 8, 9 or 10 with the exception that the DC motor 14 in each of the figures is replaced with the load shown in FIG. 11 consisting of 1102, 1104, 1106 and 1108. The AC line input 1112 to controller 1109 represents any number of AC lines dependent on which FIGS. 8 through 10 controller 1109 represents. The voltage stored on capacitor 1104 is an active voltage which is equivalent to the counter EMF of the DC motor shown in FIGS. 8 through 10. Element 1108 is an AC motor. Element 1106 is a bi-directional inverter which converts the DC voltage on capacitor 1104 to a variable frequency AC of a type that may be used to power motor 1108. Inverter 1106 draws DC current from the positive side of capacitor 1104 when motoring action is required of motor 1108. Inverter 1106 sources DC current into the positive side of capacitor 1104 when generating action is required of motor 1108. Regulator 1113, which is the control device for inverter 1106 and converter 1109, furnishes a phase command 1114 to thyristor converter 1109. The purpose of element 1109 is to maintain a level of DC voltage on capacitor 1104 that is required for correct volts per hert$_2$ at motor 1108. If motoring action is being controlled, conversion circuit 1109 furnishes DC current through inductor 1102 to capacitor 1104 If generating action is being controlled, conversion circuit 1109 draws current from capacitor 1104, passes it through inductor 1102 and returns it to AC lines as described in the foregoing text herein.

Because of the particular characteristic of this invention, a certain polarity of phase command 1114 controls motoring current while the opposite polarity of 1114 controls generating current while zero level of 1114 commands zero current. This control action is independent of the level of DC voltage on capacitor 1104. Thus, the advantages of the invention over prior art realized by applying the invention to DC motor control will also be realized in AC applications represented by FIG. 11.

Consequently, the AC line synchronization method of the present invention has the technical advantage, when incorporated into various DC and AC motor control systems which utilize phase control of thyristors to perform an AC to DC conversion, of eliminating a load voltage dependent zero offset in the phase command signal. Elimination of this offset substantially eliminates the disadvantages of prior art methods and accomplishes improvements in the motor control system into which the invention is incorporated.

These improvements include elimination of cumbersome bridge-select logic of prior art methods thereby enhancing both performance and reliability of the motor control system. Design of the regulators which supply the phase command signal is simplified further enhancing system performance and reliability. Regulator architecture is uncritical and "bridge turn-around" provision need not be incorporated in the regulators.

Dead band and snap-on effects are inherently eliminated further enhancing system performance and reliability.

System reliability and performance are yet further improved by the inherent characteristic of this invention that causes unusual dynamic conditions, such as starting a rotating motor or protective shutdown, to be safe operations.

N-PHASE SERVICE

High power converters may use a greater number of input line phases than three, for example, six phase which utilizes six input AC lines. Twelve phase and twenty four phase may also be utilized. Generally, however, a thyristor converter system such as that shown in FIG. 10 is used for each of the three incoming AC lines which are displaced in phase by 120 degrees. The outputs of the thyristor converters are then paralleled through interphase transformers or other equalizing devices before connecting to motor 14. The phase commands to the individual three-phase thyristor converters are coordinated by circuitry contained in regulator block 101 of FIG. 1, all of which are methods known to prior art for thyristor control of DC load voltage and current when incoming line phases are higher-order multiples of three. Application of the present invention to such n-phase systems is possible in that the module shown in FIG. 10 is applied as the control device for each of the three AC lines in such systems and all of the advantages of the circuit of FIG. 10 are preserved when it is replicated n/3 times in an n-phase thyristor converter.

The circuitry of FIGS. 8, 9, 10 and 11 illustrates ENABLE timing intervals of 180 degrees duration primarily because of common usage of the 180 degree timing interval in the prior art. In the present invention ENABLE timing intervals of much shorter duration may be used; the shorter intervals may be desirable for use with certain embodiments of the firing pulse generators. FIG. 12 contains a timing interval generator 32B which is identical to timing interval generator 32 of FIG. 8 with the exception of the inputs. FIG. 12 is used first to illustrate how an alternate set of input voltages to element 32 of FIG. 8, redesignated as element 32B in FIG. 12, will cause identical ENABLE outputs from either element. FIG. 12 is also used to describe how still further modification of the inputs to element 32B will cause the ENABLE outputs of element 32B to be of fixed duration of less than 180 degrees while still terminating at the critical times $t_5$ and $t_6$ shown in FIG. 6.

In FIGS. 8 and 12, L is a voltage representing a line voltage, M is a voltage representing smoothed motor terminal voltage, and M' is the negative of voltage M. In FIG. 12, $L_R$ is a voltage having the same magnitude as voltage L, but leading voltage L in phase relationship. In both figures, L is input to the non-inverting input of comparator 48, and M is input to the inverting input of comparator 48. Comparator 48 controls the termination times of the ENABLE outputs at the non-inverting output terminals of flip-flops 52 and 54. As before, ENABLE C terminates at $t_5$ when voltage L of negative slope coincides with voltage M, and ENABLE D terminates at $t_6$ when voltage L of positive slope coincides with voltage M. In FIG. 8 and 12, comparator 50 controls the times at which the ENABLE C and ENABLE D outputs become active. In FIG. 12, signal ENABLE C becomes active when voltage $L_R$ of negative slope coincides with voltage M and signal ENABLE D becomes active when voltage $L_R$ of positive slope coincides with voltage M.

In the first aspect of the circuit of FIG. 12, $L_R$ is the complement of voltage L and therefore leads voltage L by 180 degrees. For this aspect, signals ENABLE C and ENABLE D will each be of 180 degrees duration and will be identical to the ENABLE C and ENABLE D signals produced by the circuit shown in FIG. 8. Therefore the first aspect of the circuit of FIG. 12 in which signal $L_R$ is the complement of signal L is a functionally equivalent alternate embodiment of element 32 of the circuit of FIG. 8. Accordingly this first alternate embodiment of element 32, indicated as element 32B in FIG. 12, could be substituted for element 32 in the circuits of FIGS. 8, 9, 10 or 11 while still realizing the advantages claimed in this invention.

In the second aspect of the circuit of FIG. 12, signal $L_R$ is a voltage that lags the complement of signal L by a fixed number of degrees. In this aspect, the ENABLE C and ENABLE D signals terminate at times $t_5$ and $t_6$ respectively as shown in FIG. 6 but will each be of duration 180 degrees minus the degrees of lag of signal $L_R$ relative to the complement of signal L.

In a third aspect of the circuit of FIG. 12, signal $L_R$ is a signal, developed from three phase AC line voltages by prior art methods, which leads signal L by a certain number of degrees. In this embodiment, the ENABLE C and ENABLE D signals terminate at times $t_5$ and $t_6$ respectively as shown in FIG. 6 but will each be of a duration equal to the lead of signal $L_R$ relative to signal L.

In the second and third aspects of the circuit of FIG. 12, all of the advantages claimed in this invention are retained while providing ENABLE timing intervals of less than 180 degrees duration.

The disclosures herein, as a matter of clarity and convenience, describe embodiments of the invention in terms of discrete logic devices such as comparators and flip-flops. It is recognized, however, that all or part of the functions performed by element 32 of FIG. 8 can readily be incorporated as software subroutines in multipurpose microprocessor controls which manage the overall operation of thyristor converters such as those described in the FIGURES herein, thereby realizing the advantages of this invention. It should be understood that such incorporation is within the spirit and scope of the invention as defined by the appended claims.

Furthermore, although the present invention has been described in detail, it should be understood that various changes, substitutions and alteration can be made herein without departing from the spirit and scope of the invention as defined by the appended claims.

What is claimed is:

1. A thyristor control circuit for providing AC line synchronization of the firing pulses to thyristors arranged in a multi-thyristor bridge configuration across voltage lines, said control circuit comprising:
   means for monitoring the coincidence of a line voltage on said voltage lines with an average load terminal voltage;
   means controlled by said monitoring means for generating a timing signal; and
   means responsive to said generating means and to a phase command signal for transmitting firing pulses to said thyristors.

2. The thyristor control circuit of claim 1 further comprising:
   means for generating a first timing signal having a start point and an ending point;
   means for generating said ending point, said means including:
   means for ascertaining the slope of said line voltage; and
   means for detecting the coincidence of said line voltage having a negative slope with said average load terminal voltage;
   means for generating a second timing signal with a second ending point;
   means for generating said second ending point, said means including:
   means for ascertaining the slope of said line voltage; and
   means for detecting the coincidence of said line voltage having a positive slope with said average load terminal voltage.

3. The thyristor control circuit set forth in claim 2 further comprising:
   means for generating a third timing signal which is displaced 180 electrical degrees from said first timing signal; and
   means for generating a fourth timing signal which is displaced 180 electrical degrees from said second timing signal.

4. The thyristor control circuit set forth in claim 2 wherein:
   a first and a second thyristor, responsive to said first and second timing signals respectively, are arranged as a back-to-back pair such that the first thyristor controls current from an AC line to a first DC load terminal and the second thyristor controls current from said first DC load terminal back to said AC line thereby comprising a half-wave bipolar conversion element.

5. The thyristor control circuit set forth in claim 3 wherein:
- a first and third thyristor, responsive to said first and third timing signals respectively, comprise a first complementary thyristor pair, and a second and a fourth thyristor, responsive to said second and fourth timing signals respectively, comprise a second complementary thyristor pair;
- wherein each said complementary thyristor pair is comprised of two thyristors, each thyristor having one terminal connected to the same AC line such that the first thyristor of the pair conducts current from said AC line to a first DC load terminal, and the second thyristor of said pair conducts current returning from a second DC load terminal to said AC line; and
- wherein said first complementary thyristor pair is connected back-to-back with said second complementary thyristor pair, thereby comprising a bipolar conversion element within a bipolar full-wave bridge.

6. The thyristor control circuit of claim 2 wherein said timing signal generating means includes:
- a first memory that is reset at a first point in time when line voltage of negative slope coincides with an average value of load terminal voltage; and
- a second memory that is reset at a second point in time when line voltage of positive slope coincides with an average value of load terminal voltage; and
- wherein said first memory is set at a fixed time preceding said first point in time and said second memory is set at a fixed time preceding said second point in time; and
- wherein the outputs of said first and second memories are of equal duration and comprise said first and second timing signals respectively.

7. The thyristor control circuit of claim 3 wherein said timing signal generating means includes:
- a first memory that is reset at a first point in time when line voltage of negative slope coincides with an average value of load terminal voltage; and
- a second memory that is reset at a second point in time when line voltage of positive slope coincides with an average value of load terminal voltage; and
- a third memory that is reset at a third point in time that is displaced 180 electrical degrees from said first point in time; and
- a fourth memory that is reset at a fourth point in time that is displaced 180 electrical degrees from said second point in time; and
- wherein said first memory is set at a fixed time preceding said first point in time and said second memory is set at a fixed time preceding said second point in time; and
- wherein said third memory is set at a fixed time preceding said third point in time and said fourth memory is set at a fixed time preceding said fourth point in time; and
- wherein the outputs of said first, second, third and fourth memories are of equal duration and comprise first, second, third and fourth timing signals respectively.

8. The thyristor control circuit of claim 1 wherein said transmitting means includes a plurality of firing pulse generators for controlling the firing of said thyristors.

9. The thyristor control circuit of claim 4 wherein said bipolar half-wave conversion element comprises a single phase half-wave AC to DC converter.

10. The thyristor control circuit of claim 4 wherein a plurality of said bipolar half-wave conversion elements are connected as an n-phase half wave AC to DC converter.

11. The thyristor control circuit of claim 5 wherein a plurality of said bipolar conversion elements are connected as a single phase full wave bridge operative to produce bipolar AC to DC power conversion.

12. The thyristor control circuit of claim 5 wherein a plurality of said bipolar conversion elements are connected as a three phase full wave bridge operative to produce bipolar AC to DC power conversion.

13. The thyristor control circuit of claim 12 wherein a plurality of three phase full wave AC to DC converters are interconnected to comprise an n-phase full wave bipolar AC to DC converter.

14. A single phase half-wave bi-directional converter system to control current to a load, comprising:
- a first firing pulse generator responsive to phase-command and enable inputs and operable to generate a first firing signal;
- a first thyristor coupled to a terminal of said load, said first thyristor responsive to said first firing signal; a second firing pulse generator responsive to phase-command and enable inputs and operable to generate a second firing signal;
- a second thyristor coupled to the same said terminal of the load, said second thyristor responsive to said second firing signal;
- a timing interval generator operable to generate a first variable timing signal and a second variable timing signal responsive to the coincidence of a line voltage and a load terminal voltage, said first timing signal operable to enable said first pulse generator and said second timing signal operable to enable said second pulse generator, thereby synchronizing operation of said pulse generators to the line frequency.

15. The circuitry of claim 14 wherein said timing interval generator comprises:
- a first comparator having a non-inverting input for receiving a first voltage signal representative of the line voltage, and an inverting input for receiving a second voltage signal representative of the load terminal voltage;
- a second comparator having a non-inverting input for receiving said first voltage signal, and an inverting input for receiving a third voltage signal representative of an inverted load terminal voltage;
- a first edge-triggered set-reset flip-flop having a non-inverting output coupled to an enable input of said first firing pulse generator, an S input coupled to the output of said second comparator, and a negative-edge triggered R input coupled to an output of said first comparator; and
- a second edge-triggered set-reset flip-flop having a non-inverting output coupled to enable input of said second firing pulse generator, a negative-edge triggered S input coupled to the output of said second comparator, and an R input coupled to an output of said first comparator, such that said first firing pulse generator is enabled and is disabled 180 degrees later when line voltage of negative slope coincides with said load terminal voltage, and said second firing pulse generator is enabled and is disabled 180 degrees later when line voltage of positive slope exceeds the load terminal voltage.

16. A method for providing AC line synchronization of the firing pulses to thyristors arranged in a multi-thyristor bridge configuration across voltage lines, said method comprising the steps of:
   monitoring the coincidence of a line voltage on the voltage lines and a load terminal voltage;
   generating timing signals controlled by said monitoring step; and
   transmitting firing pulses to said thyristors responsive to said generating step and to an external command signal.

17. The method of claim 16 wherein said generating step includes the steps of:
   comparing the load terminal voltage with the line voltage;
   generating a first signal such that a first firing pulse generator is enabled and is later disabled when line voltage of a negative slope coincides with the load terminal voltage;
   generating a second signal such that a second firing pulse generator is enabled and is later disabled when line voltage of a positive slope coincides with the load terminal voltage; and
   wherein said first firing pulse generator controls the firing of a thyristor that controls one polarity of current to a DC load and said second firing pulse generator controls the firing of a thyristor that controls the opposite polarity of current to said DC load;
   wherein said thyristors are connected in a back-to-back relationship thereby comprising a half wave conversion element.

18. The method of claim 16 wherein said generating step includes the steps of:
   comparing the load terminal voltage with the line voltage;
   generating a first signal such that a first firing pulse generator is enabled and is later disabled when line voltage of a negative slope coincides with the average load terminal voltage;
   generating a second signal such that a second firing pulse generator is enabled and is later disabled when line voltage of a positive slope coincides with the average load terminal voltage;
   generating a third signal such that third firing pulse generator is enabled and is later disabled at a time displaced 180 electrical degrees from the disabling of said first firing pulse generator;
   generating a fourth signal such that a fourth firing pulse generator is enabled and is later disabled at a time displaced 180 electrical degrees from the disabling of said second firing pulse generator;
   wherein said first and third signals control the firing of a first pair of thyristors connected as a first complementary pair; and
   wherein said second and fourth signals control the firing of a second pair of thyristors connected as a second complementary pair; and
   wherein each said complementary thyristor pair is comprised of two thyristors, each thyristor having one terminal connected to the same AC line such that the first thyristor of the pair conducts current from said AC line to a DC load terminal, and the second thyristor of said pair conducts current returning from an opposite DC load terminal to said AC line; and
   wherein said first complementary thyristor pair is connected back-to-back with said second complementary thyristor pair, thereby comprising a bipolar conversion element within a bipolar full-wave bridge.

19. A method for controlling the DC load current, supplied by a full-wave bipolar thyristor AC to DC converter comprising the steps of:
   generating first, second, third and fourth variable timing signals responsive to the coincidence of a line voltage of a certain slope and an average load terminal voltage, said first, second, third and fourth variable timing signals being operable to enable first, second, third and fourth firing pulse generators; and
   producing first, second, third and fourth firing signals responsive to said first, second, third and fourth variable timing signals and to an external signal;
   thereby controlling a conversion element within said AC to DC converter; and
   wherein a plurality of conversion elements comprise said AC to DC converter.

20. The method of claim 19 wherein said generating steps are operative to generate timing signals of 180 degrees duration, said generating steps comprising:
   comparing a first signal representative of the line voltage with a second signal representative of the average value of load terminal voltage;
   resetting a first memory at a first point in time at which said first signal has a negative slope and coincides with said second signal;
   resetting a second memory at a second point in time at which said first signal has a positive slope and coincides with said second signal;
   setting said first memory at a time 180 electrical degrees displaced from said first point in time; and
   setting said second memory at a time 180 electrical degrees displaced from said second point in time; thereby
   generating a first variable timing signal comprised of the non-inverted output of said first memory;
   generating a second variable timing signal comprised of the non-inverted output of said second memory;
   generating a third variable timing signal comprised of an inversion of the output of said first memory; and
   generating a fourth variable timing signal comprised of an inversion of the output of said second memory.

21. The method of claim 19 wherein said generating steps are operative to generate timing signals of other than 180 degrees duration, said generating steps comprising:
   comparing a first signal representative of the line voltage with a second signal representative of the average value of load terminal voltage;
   resetting a first memory at a first point in time at which said first signal has a negative slope and coincides with said second signal;
   resetting a second memory at a second point in time at which said first signal has a positive slope and coincides with said second signal;
   resetting a third memory at a third point in time displaced 180 electrical degrees from said first point in time;
   resetting a fourth memory at a fourth point in time displaced 180 electrical degrees from said second point in time;

setting said first memory a fixed number of electrical degrees preceding said first point in time;
setting said second memory a fixed number of electrical degrees preceding said second point in time;
setting said third memory a fixed number of electrical degrees preceding said third point in time;
setting said fourth memory a fixed number of electrical degrees preceding said fourth point in time; thereby
generating said first, second, third and fourth variable timing signals comprised of the non-inverted outputs of said first, second, third and fourth memories respectively.

22. Circuitry for controlling the DC current to a load in a single-phase full-wave converter system comprising:
first, second, third and fourth thyristor pairs, each having a first thyristor and a second thyristor in a back-to-back configuration, said thyristor pairs operable for converting alternating current into direct current;
a timing interval generator for generating first, second, third and fourth variable timing signals responsive to the difference between a line voltage and a load terminal voltage;
a first firing pulse generator having a first input to receive a phase command, a second input to receive said first variable timing signal, and an output to transmit a firing pulse to the gate of said first thyristor of said first thyristor pair and to the gate of said first thyristor of said fourth thyristor pair;
a second firing pulse generator having a first input to receive a phase command, a second input to receive said second variable timing signal, and an output to transmit a firing pulse to the gate of said first thyristor of said second thyristor pair and to the gate of said first thyristor of said third thyristor pair;
a third firing pulse generator having a first input to receive a phase command, a second input to receive said third variable timing signal, and an output to transmit a firing pulse to the gate of said second thyristor of said first thyristor pair and to the gate of said second thyristor of said fourth thyristor pair;
a fourth firing pulse generator having a first input to receive a phase command, a second input to receive said fourth variable timing signal, and an output to transmit a firing pulse to the gate of said second thyristor of said second thyristor pair and to the gate of said second thyristor of said third thyristor pair; and
means controlled by said timing interval generator for enabling said firing pulse generators.

23. The circuitry of claim 22 wherein said timing interval generator comprises:
a first edge-triggered set-reset flip-flop having a non-inverting output to generate said first variable timing signal and an inverting output to generate said third variable timing signal;
a second edge-triggered set-reset flip-flop having a non-inverting output to generate said second variable timing signal and an inverting output to generate said fourth variable timing signal;
a first comparator having an output coupled to a negative-edge-triggered R input of said first set-reset flip-flop and to an R input of said second set-reset flip-flop, a non-inverting input for receiving a first voltage signal representative of the line voltage, and an inverting input for receiving a second voltage signal representative of the load terminal voltage;
a second comparator having an output coupled to an S input of said first set-reset flip-flop and to a negative-edge-triggered S input of said second set-reset flip-flop, a non-inverting input for receiving said first voltage signal, and an inverting input for receiving a third voltage signal representative of an inverted load terminal voltage;
thereby generating said first variable timing signal of 180 electrical degrees duration and terminating at the coincidence of a line voltage of negative slope and the average load terminal voltage;
thereby generating said second variable timing signal of 180 electrical degrees duration and terminating at the coincidence of said line voltage of positive slope and the average load terminal voltage;
thereby generating said third variable timing signal of 180 electrical degrees duration and displaced 180 degrees from said first variable timing signal; and
thereby generating said fourth variable timing signal of 180 electrical degrees duration and displaced 180 degrees from said second variable timing signal.

24. A thyristor control circuit for use in controlling the firing of thyristors arranged in a back-to-back relationship, said thyristors connected in a multithyristor bridge configuration across AC voltage lines, said control circuit comprising:
means for monitoring the coincidence of the line voltage on each phase of said voltage lines and a load terminal voltage;
means controlled by said monitoring means for generating a plurality of variable timing signals; and
means responsive to said generating means and an external signal for generating and transmitting firing pulses to said thyristors.

25. The thyristor control circuit of claim 24 wherein said generating means includes:
means for ascertaining the slope of said line voltage;
means for enabling a first signal when said line voltage has a positive slope and coincides with an inverted load terminal voltage and for disabling said first signal when said line voltage has a negative slope and coincides with said load terminal voltage;
means for enabling a second signal when said line voltage has a negative slope and coincides with said inverted load terminal voltage and for disabling said second signal when said line voltage has a positive slope and coincides with said load terminal voltage;
means for enabling a third signal when said line voltage has a negative slope and coincides with said load terminal voltage and for disabling said third signal when said line voltage has a positive slope, and coincides with said inverted load terminal voltage; and
means for enabling a fourth signal when said line voltage has a positive slope and coincides with said load terminal voltage and for disabling said fourth signal when said line voltage has a negative slope and coincides with said inverted load terminal voltage.

26. The thyristor control circuit of claim 24 wherein said generating means includes:
means for ascertaining the slope of said line voltage;

means for enabling a first signal when the complement of said line voltage has a negative slope and coincides with a load terminal voltage and for disabling said first signal when said line voltage has a negative slope and coincides with said load terminal voltage;

means for enabling a second signal when the complement of said line voltage has a positive slope and coincides with said load terminal voltage and for disabling said second signal when said line voltage has a positive slope and coincides with said load terminal voltage;

means for enabling a third signal when said line voltage has a negative slope and coincides with said load terminal voltage and for disabling said third signal when the complement of said line voltage has a negative slope, and coincides with said load terminal voltage; and means for enabling a fourth signal when said line voltage has a positive slope and coincides with said load terminal voltage and for disabling said fourth signal when the complement of said line voltage has a positive slope and coincides with said load terminal voltage.

27. Circuitry for controlling the DC current to a load in a three-phase full-wave AC to DC converter system, comprising:

first, second, third, fourth, fifth and sixth thyristor pairs, each having a first thyristor and a second thyristor in a back-to-back configuration, said thyristor pairs for converting alternating current into direct current; and a first firing module responsive to the difference between a first line voltage and an average load terminal voltage, said first firing module having a first output for transmitting a first firing pulse to the gate of said first thyristor of said first thyristor pair, a second output for transmitting a second firing pulse to the gate of said second thyristor of said first thyristor pair, a third output for transmitting a third firing pulse to the gate of said first thyristor of said fourth thyristor pair, and a fourth output for transmitting a fourth firing pulse to the gate of said second thyristor of said fourth thyristor pair;

a second firing module responsive to the difference between a second line voltage and said load terminal voltage, said second firing module having a first output for transmitting a fifth firing pulse to the gate of said first thyristor of said second thyristor pair, a second output for transmitting a sixth firing pulse to the gate of said second thyristor of said second thyristor pair, a third output for transmitting a seventh firing pulse to the gate of said first thyristor of said fifth thyristor pair, and a fourth output for transmitting an eighth firing pulse to the gate of said second thyristor of said fifth thyristor pair;

a third firing module responsive to the difference between a third line voltage and said load terminal voltage, said third firing module having a first output for transmitting a ninth firing pulse to the gate of said first thyristor of said third thyristor pair, a second output for transmitting a tenth firing pulse to the gate of said second thyristor of said third thyristor pair, a third output for transmitting an eleventh firing pulse to the gate of said first thyristor of said sixth thyristor pair, and a fourth output for transmitting a twelfth firing pulse to the gate of said second thyristor of said sixth thyristor pair.

28. The circuitry of claim 27 wherein each of said first, second and third firing modules comprises:

a timing interval generator for generating first, second, third and fourth variable timing signals responsive to the coincidence of a line voltage and an average load terminal voltage;

four firing pulse generators, each having a first input to receive a phase command, a second input to receive a variable timing signal from said timing interval generator, and an output to transmit a firing pulse to the gate of one of said thyristors; and means controlled by said timing interval generator for enabling said firing pulse generators.

29. The circuitry of claim 28 wherein each of said timing interval generators comprises:

a first edge-triggered set-reset flip-flop having a non-inverting output to generate said first variable timing signal and an inverting output to generate said third variable timing signal;

a second edge-triggered set-reset flip-flop having a non-inverting output to generate said second variable timing signal and an inverting output to generate said fourth variable timing signal;

a first comparator having an output coupled to a negative-edge-triggered R input of said first set-reset flip-flop and to an R input of said second set-reset flip-flop, a non-inverting input for receiving a first voltage signal representative of a line voltage, and an inverting input for receiving a second voltage signal representative of the load terminal voltage; and a second comparator having an output coupled to an S input of said first set-reset flip-flop and to a negative-edge triggered S input of said second set-reset flip-flop, a non-inverting input for receiving said first voltage signal, and an inverting input for receiving a third voltage signal representative of an inverted load terminal voltage;

thereby generating said first variable timing signal of 180 electrical degrees duration and terminating at the coincidence of a line voltage of negative slope and the average load terminal voltage;

thereby generating said second variable timing signal of 180 electrical degrees duration and terminating at the coincidence of said line voltage of positive slope and the average load terminal voltage;

thereby generating said third variable timing signal of 180 electrical degrees duration and displaced 180 degrees from said first variable timing signal; and thereby generating said fourth variable timing signal of 180 electrical degrees duration and displaced 180 degrees from said second variable timing signal.

30. Circuitry for controlling the firing of thyristors in an AC to DC converter to control the DC bus voltage, said DC bus voltage being the input to an inverter, comprising:

a plurality of timing interval generators for generating a plurality of variable timing signals responsive to the difference between a line voltage and an average load terminal voltage;

a plurality of firing pulse generators coupled between said timing interval generators and said thyristors for controlling the firing of said thyristors; and means controlled by said timing interval generator and an external signal for enabling said firing pulse generators.

31. The circuitry of claim 30 wherein said control circuit of firing pulse generators includes:
- means for generating a first timing signal having a start point and an ending point;
- means for generating said ending point, said means including:
- means for ascertaining the slope of said line voltage; and
- means for detecting the coincidence of said line voltage having a negative slope with said average load terminal voltage.

32. The circuitry of claim 31 wherein said control circuit of firing pulse generators further includes:
- means for generating a second timing signal with a second ending point;
- means for generating said second ending point, said means including:
- means for ascertaining the slope of said line voltage; and
- means for detecting the coincidence of said line voltage having a positive slope with said average load terminal voltage.

33. The circuitry of claim 32 wherein said control circuit of firing pulse generators further includes:
- means for generating third timing signal which is displaced 180 degrees from said first timing signal; and
- means for generating a fourth timing signal which is displaced 180 degrees from said second timing signal.

34. The thyristor control circuit set forth in claim 32 wherein:
- a first and a second thyristor, responsive to said first and second timing signals, respectively, are arranged as a back-to-back pair such that the first thyristor controls current from an AC line to a first DC load terminal and the second thyristor controls current from said first DC load terminal back to said AC line thereby comprising a half-wave bipolar conversion element.

35. The thyristor control circuit set forth in claim 33 wherein:
- a first and a third thyristor, responsive to said first and third timing signals, respectively, comprise a first complementary thyristor pair, and a second and a fourth thyristor, responsive to said second and fourth timing signals, respectively, comprise a second complementary thyristor pair;
- wherein each said complementary thyristor pair is comprised of two thyristors, each thyristor having one terminal connected to the same AC line such that the first thyristor of the pair conducts current from said AC line to a DC load terminal, and the second thyristor of said pair conducts current returning from an opposite DC load terminal to said AC line; and
- wherein said first complementary thyristor pair is connected back-to-back with said second complementary thyristor pair, thereby comprising a bipolar conversion element within a bipolar full-wave bridge.

36. The thyristor control circuit of claim 34 wherein said bipolar half-wave conversion element comprises a single phase half-wave AC to DC converter operative to control bipolar current flow to the DC bus of an inverter.

37. The thyristor control circuit of claim 34 wherein a plurality of said bipolar half-wave conversion elements are connected as an n-phase half wave AC to DC converter operative to control bipolar current flow to the DC bus of an inverter.

38. The thyristor control circuit of claim 35 wherein a plurality of said bipolar conversion elements are connected as a single phase full wave AC to DC converter operative to control bipolar current flow to the DC bus of an inverter.

39. The thyristor control circuit of claim 35 wherein a plurality of said bipolar conversion elements are connected as a three phase full wave AC to DC converter operative to control bipolar current flow to the DC bus of an inverter.

40. The thyristor control circuit of claim 39 wherein a plurality of three phase full wave AC to DC converters are interconnected to comprise an n-phase full wave AC to DC converter operative to control bipolar current flow to the DC bus of an inverter.

* * * * *